(12) United States Patent
Mombour (10) Patent No.: US 8,376,159 B2
(45) Date of Patent: Feb. 19, 2013

(54) DEVICE FOR DAMPING TRACTIVE AND COMPRESSIVE FORCES

(75) Inventor: Klaus Mombour, Moers (DE)

(73) Assignee: Voith Patent GmbH, Heidenheim (DE)

( * ) Notice: Subject to any disclaimer, the term of this patent is extended or adjusted under 35 U.S.C. 154(b) by 183 days.

(21) Appl. No.: 12/923,304

(22) Filed: Sep. 14, 2010

(65) Prior Publication Data

US 2011/0079569 A1   Apr. 7, 2011

(30) Foreign Application Priority Data

Oct. 1, 2009 (EP) .................................. 09171936

(51) Int. Cl.
*B61G 9/08* (2006.01)

(52) U.S. Cl. .......................................... 213/43; 213/223

(58) Field of Classification Search ................ 213/40 R, 213/43, 223; 188/266, 322.13, 322.2, 322.22; 293/107

See application file for complete search history.

(56) References Cited

U.S. PATENT DOCUMENTS

| | | | | |
|---|---|---|---|---|
| 3,033,384 A | * | 5/1962 | Zanow et al. ................. | 213/43 |
| 3,139,989 A | * | 7/1964 | Thornhill ..................... | 213/223 |
| 3,301,410 A | * | 1/1967 | Seay ............................ | 213/43 |
| 3,412,870 A | * | 11/1968 | Rollins ......................... | 213/8 |
| 3,589,528 A | * | 6/1971 | Stephenson ................. | 213/43 |
| 3,752,329 A | * | 8/1973 | Seay et al. .................... | 213/8 |
| 3,791,534 A | * | 2/1974 | Stephenson ................. | 213/43 |
| 5,025,938 A | * | 6/1991 | Bomgardner et al. ........ | 213/43 |
| 5,908,123 A | * | 6/1999 | Huggins ....................... | 213/223 |
| 5,927,523 A |   | 7/1999 | Huggins et al. | |

FOREIGN PATENT DOCUMENTS

| | | |
|---|---|---|
| DE | 29610607 | 8/1996 |
| EP | 0578187 | 1/1994 |
| EP | 0595160 | 5/1994 |

* cited by examiner

*Primary Examiner* — S. Joseph Morano
*Assistant Examiner* — Zachary Kuhfuss
(74) *Attorney, Agent, or Firm* — Jean C. Edwards, Esq.; Edwards Neils PLLC (57) ABSTRACT

The invention relates to a device for damping tractive and compressive forces which damps forces acting in both the tractive and compressive directions over a wide range, the device operating to be free of wear and having small overall length. The device has a damping system held in a housing and which has a resilient unit and a hydraulic damping arrangement, and a piston rod which is displaceable in the longitudinal direction relative to the housing of the damping system. Formed in an end region of the piston rod is a piston head which is held in a first hydraulic chamber of the hydraulic damping arrangement to be displaceable. If there is longitudinal movement of the piston head relative to the first hydraulic chamber, hydraulic fluid flows in a throttled manner, via a transfer-flow system, to a second hydraulic chamber of the hydraulic damping arrangement.

17 Claims, 7 Drawing Sheets

DEVICE FOR DAMPING TRACTIVE AND COMPRESSIVE FORCES

CROSS-REFERENCE TO RELATED APPLICATIONS

The present application claims priority from European Patent Application No. 09171936.9, filed Oct. 1, 2009, the contents of which are herein incorporated by reference in their entirety.

BACKGROUND OF THE INVENTION

1. Field of the Invention

The present invention relates to a device for damping tractive and compressive forces in the form of a safety device against shock loads constructed to operate regeneratively.

2. Description of the Related Art

From rail-borne vehicle engineering it is known for safety devices against shock loads, in the form of what are referred to as buffers for example, to be inserted between the bodies of the individual carriages or wagons of a multi-member train of vehicles. These are vehicle-mounted components which, in the event of a collision or an impact against a fixed obstacle, are intended to absorb energy and thus prevent damage to the vehicle or what it is carrying. Buffers exist principally on rail-borne vehicles, one or two usually being used on the parts of the structure mounted at the end-faces, their purpose being to absorb the horizontal compressive forces which act on the rail-borne vehicle from outside in the longitudinal direction thereof.

Following this principle, there are two types of buffer which can be used on rail-borne vehicles as safety devices against shock loads, namely so-called "central buffers" where the safety device against shock loads is mounted on the longitudinal axis of the vehicle, meaning that there is only one buffer, in the centre of the buffer beam, at each end of the vehicle. What are also known on the other hand are so-called "side buffers" where there are two buffers at the end of the rail-borne vehicle.

It is thus known from the field of rail-borne vehicle engineering for, in the case of a multi-member train of rail-borne vehicles, the bodies of the individual carriages or wagons to be equipped with so-called side buffers or UIC buffers when the bodies of the carriages or wagons are not connected together by a single bogie and the distance between the bodies of two carriages or wagons which are coupled together is thus able to vary when they are travelling along in operation. The purpose of these side buffers is to absorb and damp the shock loads which occur during normal travel at, for example, the time of braking or pulling away.

It is also known from the prior art for a safety device against shock loads in the form of a tractive/shock load arrangement to be built into a coupling bar which is used to transmit tractive and compressive forces between the bodies of two adjacent carriages or wagons of a multi-member train of vehicles. This tractive/shock load arrangement is designed to absorb and damp tractive and compressive forces of up to a defined size. It is for example conceivable in this case for there to be used as a tractive/shock load arrangement a resilient unit which can be loaded both in traction and in compression, to enable the tractive and compressive forces which occur in operation to be suitably damped in this way.

SUMMARY OF THE INVENTION

The object underlying the present invention is to specify a device which is designed to damp forces acting in both the tractive and compressive directions over as wide a range as possible, the device operating in such a way as to be free of wear and being notable in particular for its small overall length.

This object is achieved in accordance with the invention by a device for damping tractive and compressive forces, which device for damping tractive and compressive forces has a damping system which is held in a housing and which is made up on the one hand of a resilient unit and on the other of a hydraulic damping arrangement. The resilient unit is arranged between a first abutment which is in a fixed position relative to the housing of the damping system and a second abutment which is displaceable relative to the first abutment. If the second abutment moves relative to the housing of the damping system in the direction of the first abutment, the resilient unit which is held between the first and second abutments is loaded in compression and compressed. The force from the compression of the resilient unit opposes the movement of the second abutment when this happens. In one embodiment of the solution according to the invention the second abutment is an annular piston which is displaceable in opposition to the resilient force from the resilient unit.

The hydraulic damping arrangement of the damping system which is used in the solution according to the invention has a first hydraulic chamber which is filled with hydraulic fluid, such for example as hydraulic oil, and a second hydraulic chamber which is likewise filled with hydraulic fluid. As will be described in detail below, the two hydraulic chambers are connected together by a first and a second transfer-flow system, thus enabling hydraulic fluid to flow from the first hydraulic chamber to the second hydraulic chamber, or from the second hydraulic chamber to the first hydraulic chamber, in a throttled manner.

In the solution according to the invention provision is made for the second hydraulic chamber to be formed between the first hydraulic chamber and the second abutment. Specifically, provision is made for the second abutment, which has already been mentioned and which is displaceable relative to the housing of the damping system and relative to the first abutment in the longitudinal direction of the damping system, to form a wall of the second hydraulic chamber. The second abutment is therefore displaced in the direction of the first abutment when hydraulic fluid flows from the first hydraulic chamber into the second hydraulic chamber. The displacement of the second abutment in the direction of the first abutment compresses the resilient unit which is held between the first and second abutments. When this happens, the restorative force emanating from the resilient unit acts in opposition to the pressure of the hydraulic fluid in the second hydraulic chamber.

The tractive and compressive forces which are to be damped by the device are applied to the damping system by a piston rod which is displaceable in the longitudinal direction relative to the housing of the damping system and which has in its end region a piston head which is held in the first hydraulic chamber. Specifically, the piston head of the piston rod is held in the first hydraulic chamber in such a way as to be displaceable relative to the first hydraulic chamber and, when it undergoes a longitudinal displacement relative to the first hydraulic chamber, it divides the first hydraulic chamber into a front hydraulic-chamber region remote from the piston rod and a rear hydraulic-chamber region adjacent the piston rod.

If compressive forces are applied to the damping system, the piston head is moved relative to the first hydraulic chamber in the direction of the front hydraulic-chamber region. At least some of the hydraulic fluid present in the front hydraulic-chamber region is expelled when this happens and flows in a throttled manner, via the first transfer-flow system, to the rear hydraulic-chamber region and to the second hydraulic chamber. The volume of hydraulic fluid which is expelled from the front hydraulic-chamber region in the event of a longitudinal movement of the piston head relative to the first hydraulic chamber corresponds to the volume which the piston rod expels when it advances into the damping system. Because, ideally, the hydraulic fluid is incompressible, the transfer flow of the hydraulic fluid from the first hydraulic chamber to the second hydraulic chamber at the same time causes the second abutment to be displaced towards the first abutment in opposition to the resilient force from the resilient unit.

In addition to the first transfer-flow system which allows a transfer flow of hydraulic fluid from the first hydraulic chamber to the second hydraulic chamber, the device according to the invention also has a second transfer-flow system. This second transfer-flow system allows a transfer flow of hydraulic fluid from the rear hydraulic-chamber region and the second hydraulic chamber to the front hydraulic-chamber region.

The second transfer-flow system causes a return to centre of the piston to its neutral position. Specifically, the piston head—having previously been displaced relative to the first hydraulic chamber in the direction of the front hydraulic-chamber region by a compressive stress for example—is returned to its starting position as soon as a compressive force ceases to be applied to the damping system via the piston rod and the piston head. What in fact then happens is that the restorative force from the resilient unit forces hydraulic fluid from the second hydraulic chamber through the second transfer-flow system and back into the front hydraulic-chamber region of the first hydraulic chamber. In this way, the resilient unit produces a return travel on the part of the piston rod, which means that the piston head moves about a defined centre position.

The device according to the invention is not of course designed to damp only compressive forces which are applied to the damping system via the piston rod and the piston head. Rather, the solution according to the invention also makes it possible for tractive forces which act on the piston rod and move the piston head relative to the first hydraulic chamber in the direction of the rear hydraulic-chamber region to be damped reliably. If there is a longitudinal movement of the piston head relative to the first hydraulic chamber in the direction of the rear hydraulic-chamber region, hydraulic fluid flows from the rear hydraulic-chamber region via the above-mentioned second transfer-flow system to the front hydraulic-chamber region of the first hydraulic chamber. At the same time, the second abutment moves relative to the housing of the damping system in the direction of the first hydraulic chamber, and consequently the volume of the second hydraulic chamber is reduced. The volume by which the second hydraulic chamber is reduced in the event of a tractive stress corresponds to the volume of that region of the piston rod which is withdrawn from the damping system, and in particular from the hydraulic damping arrangement of the damping system, when the tractive stress occurs.

In the solution according to the invention, provision is made for the first transfer-flow system, via which hydraulic fluid flows from the front hydraulic-chamber region into the rear hydraulic-chamber region and into the second hydraulic chamber if there is a longitudinal movement of the piston head relative to the first hydraulic chamber in the direction of the front hydraulic-chamber region, to have at least one so-called multiplier valve. In functional terms, the multiplier valve is comparable to a valve preloaded by a spring, which allows hydraulic fluid to pass only from the front hydraulic-chamber region to the rear hydraulic-chamber region and the second hydraulic chamber. Specifically, the multiplier valve is designed to maintain a settable pressure upstream of its inlet in order to maintain a pressure head in the front hydraulic-chamber region if the damping system is loaded in compression.

To prevent hydraulic fluid from being able to flow, via the second transfer-flow system, past the at least one multiplier valve and into the rear hydraulic-chamber region of the first hydraulic chamber, i.e. into the second hydraulic-chamber region, if there is a compressive load on the damping system, i.e. if there is a longitudinal movement of the piston head relative to the first hydraulic chamber in the direction of the front hydraulic-chamber region, the second transfer-flow system is provided with at least one ball non-return valve which allows hydraulic fluid to pass only from the rear hydraulic-chamber region and the second hydraulic chamber into the front hydraulic-chamber region.

Hence, to sum up it has to be said that, both when there is a longitudinal movement of the piston head relative to the first hydraulic chamber in the direction of the front hydraulic-chamber region and when there is a longitudinal movement of the piston head relative to the first hydraulic chamber in the direction of the rear hydraulic-chamber region, hydraulic fluid is forced, via the first and second transfer-flow systems respectively, from the front hydraulic-chamber region into the rear hydraulic-chamber region and from the rear hydraulic-chamber region into the front hydraulic-chamber region respectively. Because the first and second transfer-flow systems enable the transfer flow of the hydraulic fluid which takes place to be a throttled one, there is a damping effect both when there is a tractive load on the damping system and when there is a compressive one. When there is a compressive load on the damping system, i.e. when the piston head moves relative to the first hydraulic chamber in the direction of the front hydraulic-chamber region, hydraulic fluid is forced out of the front hydraulic-chamber region via the first transfer-flow system into the second hydraulic chamber by the longitudinal movement of the piston head. The increase in pressure thereby produced in the second hydraulic chamber results in the second abutment, which defines one end of the second hydraulic chamber, moving in the direction of the first abutment. This results in a compression of the resilient unit arranged between the first and second abutments. What therefore occurs if there is a compressive load on the damping system is not only the damping effect caused by a throttled transfer flow of hydraulic fluid through the first transfer-flow system but also the damping effect caused by a compression of the resilient unit between the first and second abutments.

The piston head moves about a defined centre position as dictated by the tractive or compressive stress. When this happens, the pressure generated by the piston head in the first hydraulic chamber is compensated for dynamically by the hydraulic fluid being discharged into the second hydraulic chamber via the first transfer-flow system in a throttled manner. In this way, any loading along the longitudinal axis of the damping system is compensated for immediately and in particular without any wear, because the special layout and construction of the damping system make it possible for both tractive and compressive forces to be able to be damped without any additional functional components.

Advantageous refinements of the device according to the invention for damping tractive and compressive forces are specified in the dependent claims.

As stated above, provision is made in the solution according to the invention for hydraulic fluid to flow from the front hydraulic-chamber region via the first transfer-flow system into the rear hydraulic-chamber region and into the second hydraulic chamber if there is a compressive load on the damping system, i.e. if the piston head advances into the first hydraulic chamber. Provision is made in particular in this case for at least one multiplier valve to be provided in the first transfer-flow system, through which multiplier valve the hydraulic fluid flows which is expelled from the front hydraulic-chamber region when the piston head advances. What is achieved by the provision of the multiplier valve in the first transfer-flow system is that the pressure in the second hydraulic chamber is multiplied. This pressure which establishes itself in the second hydraulic chamber acts against the second abutment and causes a longitudinal displacement of the second abutment relative to the first abutment combined with compression of the resilient unit provided between the first and second abutments. When on the other hand the piston withdraws from the damping system, the hydraulic fluid flows back into the front hydraulic-chamber region of the first hydraulic chamber via a simple ball non-return valve. The resilient force from the resilient unit thus acts directly on the travel which is performed by the hydraulic damping arrangement as a buffer.

In a preferred refinement of the solution according to the invention, provision is made for the hydraulic damping arrangement to make dynamic damping possible. There is provided for this purpose a system of passages which connects the first hydraulic chamber, and in particular the front hydraulic-chamber region of the first hydraulic chamber, to the input of the at least one multiplier valve, with the effective flow cross-section of the system of passages depending on how far the piston head is displaced relative to the first hydraulic chamber in the direction of the front hydraulic-chamber region. Hence, provision is made in this preferred refinement of the device according to the invention for the effective flow cross-section of the system of passages to vary its effective flow cross-section as a function of the travel of the piston. If there is a compressive load on the damping system, i.e. if the piston head advances into the first hydraulic chamber, the hydraulic fluid thus flows out of the front hydraulic-chamber region and into the rear hydraulic-chamber region and into the second hydraulic chamber, in a throttled manner, with the degree of throttling depending on the travel of the piston.

In a preferred embodiment of the latter refinement, in which latter refinement dynamic damping is achieved with the help of an effective flow cross-section dependent on travel for the system of passages which connects the front hydraulic-chamber region to the inlet of the multiplier valve, provision is made for the system of passages to have a plurality of passages which connect the first hydraulic chamber to the inlet of the multiplier valve, the passages opening into the first hydraulic chamber at a distance from one another in the longitudinal direction of the first hydraulic chamber. When the piston advances into the first hydraulic chamber, the individual passages of the system of passages are thus blocked one after another by the piston head as its travel increases, and the effective flow cross-section over which the hydraulic fluid expelled from the front hydraulic-chamber region is able to flow to the inlet of the multiplier valve thus decreases as the travel of the piston increases. It should be borne in mind in this case that the device according to the invention is preferably so designed that if a shock load is applied to the device the speed of the colliding bodies relative to one another decreases. The speed at which the piston rod is forced in thus goes down too. Because the hydraulic forces are dependent on, amongst other things, the speed at which the piston rod is forced in and the effective flow cross-section over which the hydraulic fluid expelled from the front hydraulic-chamber region is able to flow to the inlet of the multiplier valve, the effective flow cross-section is reduced as the travel of the piston rod increases in order to keep the hydraulic forces very largely constant.

There are of course also other embodiments which may be considered for the purposes of dynamic damping. It is for example conceivable for a travel-dependent orifice to be provided, thus enabling the effective flow cross-section of the system of passages to be reduced in this way all the more severely the further the piston head is displaced relative to the first hydraulic chamber in the direction of the front hydraulic-chamber region.

The dynamic damping as described above of the hydraulic damping arrangement is of advantage not only for a compressive load on the damping arrangement but also for a tractive one. In particular, it is preferred, when the piston head is displaced to its maximum relative to the first hydraulic chamber in the direction of the front hydraulic-chamber region, for the above-mentioned system of passages which connects the first hydraulic chamber to the inlet of the multiplier valve to have at least one passage which opens into the rear hydraulic-chamber region of the first hydraulic chamber and for it also to have at least one passage which opens into the front hydraulic-chamber region of the first hydraulic chamber. The at least one passage of the system of passages which, when the piston head is displaced to its maximum in the direction of the front hydraulic-chamber region of the first hydraulic chamber, opens into the rear hydraulic-chamber region should preferably have in this case a ball non-return valve which automatically blocks hydraulic fluid from passing through the at least one passage to the rear hydraulic-chamber region. When the piston withdraws from the damping system, the hydraulic fluid which is expelled from the rear hydraulic-chamber region by the piston head is able to flow directly into the front hydraulic-chamber region of the first hydraulic chamber through this at least one passage, i.e. without taking a roundabout route through the second hydraulic chamber. If, however, the piston has already partly withdrawn from the damping system, the mouth region of the at least one passage is blocked by the piston head, which means that the hydraulic fluid which is expelled from the rear hydraulic-chamber region of the first hydraulic chamber is then only able to make its way to the front hydraulic-chamber region of the first hydraulic chamber via the second transfer-flow system. Hence this preferred refinement of the solution according to the invention also makes travel-dependent damping possible if there is a tractive load on the damping system.

In a preferred embodiment of the first transfer-flow system, which transfer-flow system makes possible a transfer flow of hydraulic fluid from the front hydraulic-chamber region of the first hydraulic chamber to the rear hydraulic-chamber region of the first hydraulic chamber and to the second hydraulic chamber, provision is made for a gap to be formed, at least in a region or regions, between the first hydraulic chamber and the housing of the damping system, the inlet of the at least one multiplier valve being connected to the first hydraulic chamber via the gap. If—as stated above—a system of passages is provided which has a plurality of passages which connect the first hydraulic chamber to the input of the multiplier valve, it is of advantage for the individual passages of the system of passages to make a connection between the first hydraulic chamber and the gap. It is thus conceivable in particular for the passages of the system of passages to take the form of radial bores in the wall, i.e. the housing, of the first hydraulic chamber.

In a preferred embodiment of the device according to the invention provision is made, with a view to providing the second transfer-flow system, for the ball non-return valve which is arranged between the second hydraulic chamber and the front hydraulic-chamber region to be arranged in a passage which connects the front hydraulic-chamber region to the gap which is formed at least in a region or regions between the first hydraulic chamber and the housing of the damping system, the ball non-return valve being designed to automatically block hydraulic fluid from passing from the gap to the second hydraulic chamber. This is a solution for the first transfer-flow system which is particularly easy to implement.

In a preferred embodiment of the solution according to the invention, at least one passage is provided which connects the rear hydraulic-chamber region of the first hydraulic chamber to the second hydraulic chamber and allows hydraulic fluid to pass both from the rear hydraulic-chamber region of the first hydraulic chamber to the second hydraulic chamber and from the second hydraulic chamber to the rear hydraulic-chamber region. This passage which connects the rear hydraulic-chamber region of the first hydraulic chamber to the second hydraulic chamber thus belongs both to the first transfer-flow system which allows a throttled transfer flow of hydraulic fluid from the front hydraulic-chamber region of the first hydraulic chamber to the second hydraulic chamber and also to the second transfer-flow system which allows a throttled transfer flow of hydraulic fluid from the rear hydraulic-chamber region of the first hydraulic chamber via the second hydraulic chamber to the front hydraulic-chamber region of the first hydraulic chamber.

With a view to providing the first transfer-flow system in which the at least one multiplier valve is provided, provision is made in a preferred embodiment of the solution according to the invention for the outlet of the at least one multiplier valve to open into a valve chamber which is connected to the rear hydraulic-chamber region of the first hydraulic chamber via a ball non-return valve, the ball non-return valve automatically blocking hydraulic fluid from passing from the rear hydraulic-chamber region to the valve chamber. It is preferred in this case for at least one passage to be provided which connects the valve chamber to the second hydraulic chamber, with the control piston of the multiplier valve blocking the at least one passage when the multiplier valve is in the fully open state.

What is achieved with this embodiment is that the damping system behaves differently as dictated by the type of load. If there is a quasi-static stress on the damping system, i.e. if the piston moves into the first hydraulic chamber relatively slowly, which is the case when moderate compressive forces are being damped, such for example as when the compressive forces which occur in normal shunting operations are being damped, then the hydraulic fluid which is expelled from the front hydraulic-chamber region of the first hydraulic chamber can flow directly from the front hydraulic-chamber region of the first hydraulic chamber into the second hydraulic chamber.

When on the other hand there is a dynamic stress on the damping system, or when in other words the piston is advanced into the damping system relatively quickly due to a compressive load which arises in the event of a crash, the direct connection between the front hydraulic-chamber region of the first hydraulic chamber and the second hydraulic chamber is blocked, because the multiplier valve is in its fully open state in this event and the control piston of the multiplier valve blocks the at least one passage which connects the valve chamber of the multiplier valve to the second hydraulic chamber. Hence, when there is a dynamic stress on the damping system, the hydraulic fluid which is expelled from the front hydraulic-chamber region by the piston head is conveyed first into the rear hydraulic-chamber region of first hydraulic chamber. The hydraulic fluid which is expelled can then flow into the second hydraulic chamber via a passage which connects the rear hydraulic-chamber region of the first hydraulic chamber to the second hydraulic chamber.

To enable the resilient unit of the damping system to make a contribution to damping in the event of a tractive stress, provision is made in a preferred refinement of the solution according to the invention for the first hydraulic chamber to be held in the housing of the damping system in such a way as to be displaceable relative to the housing in the direction of the resilient unit. If there is a longitudinal displacement of the first hydraulic chamber in the direction of the resilient unit, which is the case if there is a tractive stress, then a pressure below atmospheric is generated between the housing of the resilient unit and that end-face of the first hydraulic chamber which is remote from the resilient unit. Because the first hydraulic chamber is held in the housing of the damping system in such a way as to be displaceable relative to the housing in the direction of the resilient unit, what is achieved is that the pressure in the second hydraulic chamber is increased if there is a tractive stress on the damping system, and consequently the second abutment moves in the direction of the first abutment and the resilient unit is thus compressed. Hence the resilient unit also serves to damp the forces which arise when the stress is tractive. Because the resilient unit is basically stressed only in compression—regardless of whether it is tractive or compressive forces which are applied to the damping system—operation with little wear is possible when tractive and compressive forces are being damped.

The pressure below atmospheric which is generated when the first hydraulic chamber is displaced relative to the housing of the damping system in the direction of the resilient unit due to the effect of a tractive stress opposes the longitudinal displacement of the first hydraulic chamber in the direction of the resilient unit, which assists the return of the first hydraulic chamber to its starting position (neutral position) when the tractive load is no longer present.

In a preferred refinement of the last embodiment mentioned, in which latter the first hydraulic chamber is held in the housing of the damping system in such a way as to be displaceable relative to the housing of the damping system in the direction of the resilient unit, provision is made for the distance for which the first hydraulic chamber is able to move in the longitudinal direction relative to the housing of the damping system to correspond to that distance for which the resilient unit is compressed when the piston head moves, from its rear position in which the piston head is displaced to its maximum relative to the first hydraulic chamber in the direction of the rear hydraulic-chamber region, to its front position in which the piston head is displaced to its maximum relative to the first hydraulic chamber in the direction of the front hydraulic-chamber region. This preferred refinement of the solution according to the invention provides a damping device which is of a particularly short form despite its having optimum properties for damping tractive and compressive forces.

In a preferred refinement of the last embodiment mentioned, provision is made for the resilient unit to be in an uncompressed state when the piston head is in its front position and the first hydraulic chamber has not been displaced in the longitudinal direction relative to the housing of the damping system. In this preferred refinement, the piston is thus in the centre position when the resilient unit is in its uncompressed state, i.e. when the piston head is in its front position and the first hydraulic chamber has not been displaced in the longitudinal direction relative to the housing of the damping system. If there is then a tractive or compressive stress on the damping system, the piston is moved respectively out of or into the damping system about this centre position.

In a preferred embodiment of the device according to the invention for damping tractive and compressive forces, provision is made for the end region of the piston rod opposite from the piston head to be connected to a cup-like outer housing, the housing of the damping system being held in the outer housing in such a way as to be at least partly displaceable telescopically in the longitudinal direction relative to the outer housing. By the provision of an outer housing of this kind it becomes possible for additional protection to be provided for the damping system by its being held in the housing of the damping system in an encapsulated form. The outer housing should preferably co-operate with the housing of the damping system in this case in such a way that, if there is a displacement of the piston rod in the longitudinal direction relative to the housing of the damping system, this longitudinal displacement is guided by the outer housing.

In a preferred refinement of the last embodiment mentioned, in which latter an outer housing connected to the piston rod is provided, the distance for which the housing of the damping system is displaceable relative to the outer housing corresponds to the travel which the piston head makes between a front position, in which the piston head is displaced relative to the first hydraulic chamber to its maximum in the direction of the front hydraulic-chamber region, and a rear position in which the piston head is displaced relative to the first hydraulic chamber to its maximum in the direction of the rear hydraulic-chamber region. This embodiment ensures that a device is produced for damping both tractive forces and also compressive forces, the overall length of the device in particular being reduced.

To enable the piston rod to move relative to the housing of the damping system in as unhampered a way as possible, it is preferred for appropriate guiding surfaces to be provided which guide the movement of the piston rod relative to the housing of the damping system. It is for example conceivable for the outer housing to co-operate with the housing of the damping system by means of appropriate guiding surfaces in the last refinement mentioned in order to make guided movement of the housing of the damping system possible relative to the outer housing.

Basically, it is preferred for the resilient unit to have at least one spring and in particular a coil, disc, annular, rubber or elastomer spring which is held in an encapsulated form in the space between the first abutment and the second abutment.

Finally, in an embodiment of the solution according to the invention which is a particular preference, provision is made for the hydraulic damping arrangement to have an overload valve which is connected in parallel with the at least one multiplier valve and which allows hydraulic fluid to be cross only from the front hydraulic-chamber region to the rear hydraulic-chamber region and to the second hydraulic chamber. In a conceivable embodiment of this overload valve it may be preloaded by a coil spring, disc spring, annular spring, elastomer spring or rubber spring and, this being the case, it is so designed that it changes to its open state at a presettable pressure. This presettable pressure depends on the one hand on the preloading of the spring and on the other hand on the cross-section when open.

The advantages of this latter embodiment of the solution according to the invention, or in other words in the embodiment in which an overload valve is connected in parallel with the at least one multiplier valve, are obvious. In particular, the overload valve serves to limit the maximum pressure which can be generated in the second hydraulic chamber. If for example under a quasi-static load in the compressive direction the pressures generated by means of the resilient unit and the multiplier valve, and the forces resulting therefrom, are higher than are needed for typical railway operation, then they are limited by the overload valve. The housing, and the seals corresponding to the said housing, therefore do not need to be designed for such high pressures but simply for the pressure which is preset by the overload valve.

A further advantage can be considered to be the limiting of dynamic forces in the event of compressive loading. If under a quasi-static load in the compressive direction the pressures generated by means of the resilient unit and the multiplier valve, and the forces resulting therefrom, are higher than are needed for typical railway operation, it may happen that it is not possible for the dynamic forces to be minimised because, as a function of the spring unit and the multiplier valve, the quasi-static forces may already be higher than what is specified as the maximum dynamic force. If, however, the overload valve limits the pressure, and hence the force, to a level which is lower than the maximum dynamic force specified, then it is possible for the cross-section of the orifice to be designed in such a way that the maximum dynamic force specified is kept to.

BRIEF DESCRIPTION OF THE DRAWINGS

An embodiment of the device according to the invention for damping tractive and compressive forces will be described below by reference to the accompanying drawings.

In the drawings.

DESCRIPTION OF THE INVENTION

Figure 1:
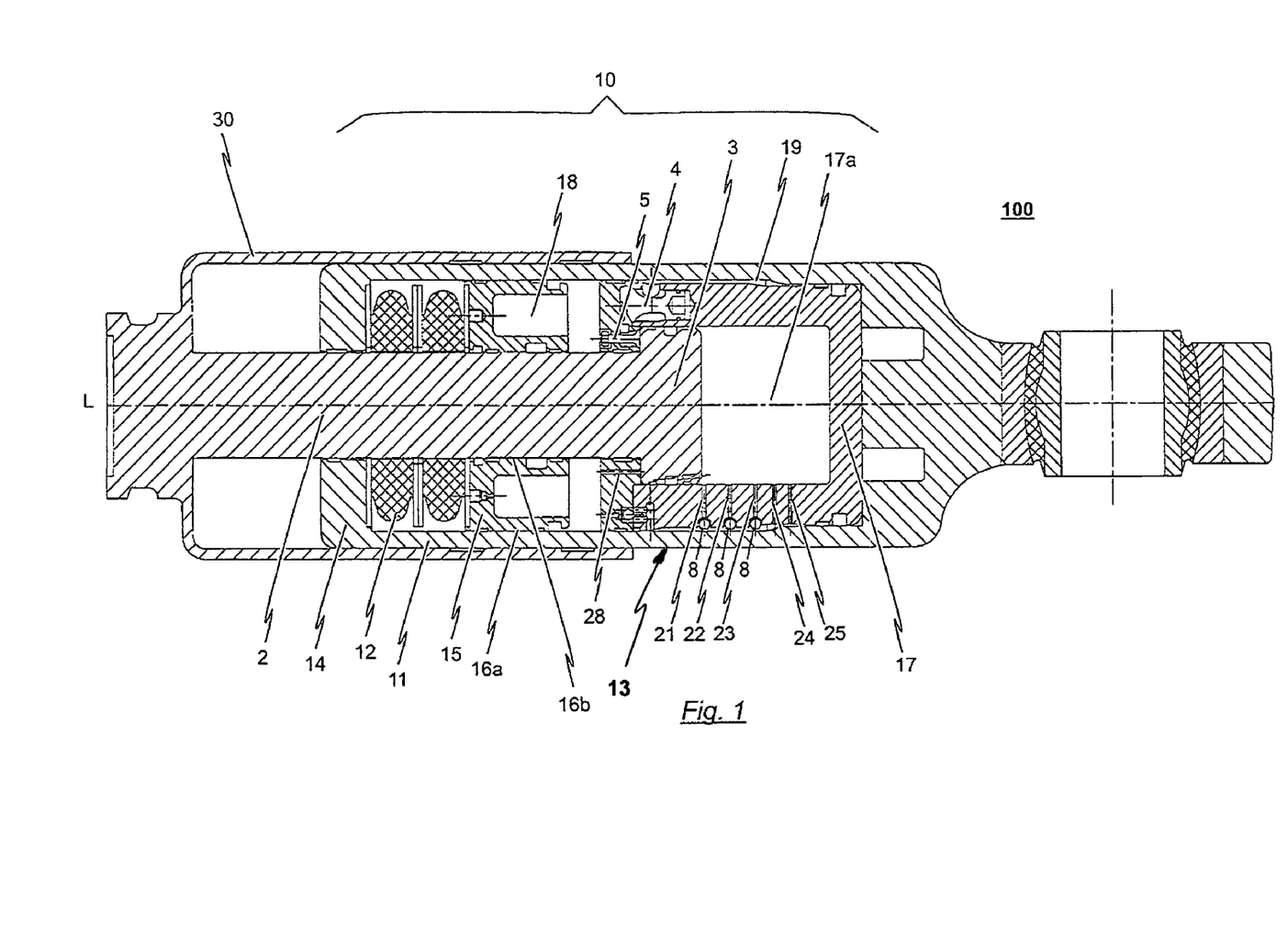
FIG. 1 is a schematic view in longitudinal section of an embodiment of the device according to the invention for damping tractive and compressive forces, in the unloaded state.

In what follows, a possible embodiment of the device according to the invention for damping tractive and compressive forces, and the way in which it operates, will be described by reference to the accompanying drawings. FIG. 1 shows the embodiment of the device 100 according to the invention in the unloaded state in this case, i.e. in the state in which neither tractive nor compressive forces are applied to the device 100.

The device 100 has, in essence, a damping system 10 which is held in a housing 11, and a piston rod 2 which is displaceable relative to the housing 11 in the longitudinal direction L of the damping system 10 and by means of which tractive and compressive forces can be applied to the damping system 10. The damping system 10 which is held in the housing 11 is a combination of a resilient unit 12 and a hydraulic damping arrangement 13. In the embodiment of the device 100 according to the invention which is shown, the basis of the resilient unit 12 is two annular elastomer springs which are arranged one behind the other in such a way that the piston rod 2 runs through the openings in the annular elastomer springs. The present invention is not, however, limited to a resilient unit 12 in which annular elastomer springs are used. What may equally well be used instead in place of or in addition to the elastomer springs are coil springs, disc springs or rubber springs. Basically, it is even conceivable for a pneumatic strut to be used for the resilient unit 12.

Nor is the invention limited to the resilient unit 12 being made up of two resilient members as the case is with the embodiment shown in the drawings.

The two annular elastomer spring members which form the resilient unit 12 in the embodiment shown are arranged between a fixed first abutment 14 and a second abutment 15 which is displaceable relative to the first abutment 14. In the embodiment shown, the fixed first abutment 14 is at the same time the end-wall of the housing 11 of the damping system 10. The second abutment 15, which is designed to be displaceable in the longitudinal direction L of the damping system 10 relative to the first abutment 14 and thus relative to the housing 11 of the damping system 10, takes the form in the embodiment shown of an annular piston which is in line axially with the two elastomer spring members, with the piston rod 2 running through the opening of the annulus formed by the annular piston. The annular piston itself has guiding surfaces 16a, 16b which co-operate on the one hand with piston rod 2 and on the other hand with the inner wall of the housing 11 of the damping system 10, to guide the movement of the annular piston (the second abutment 15) relative to the first abutment 14.

On the other hand, the annular piston seals off the region in which the resilient unit 12 is held with a fluid-tight seal, thus causing the resilient unit 12 to be held in a resilient-unit chamber in an encapsulated form and in particular preventing any hydraulic fluid from making its way from the hydraulic damping arrangement 13 of the damping system 10 to the resilient unit 12.

As already indicated, provision is made in the embodiment of the device 100 according to the invention which is shown for the damping system 10 to have a hydraulic damping arrangement 13 in addition to the resilient unit 12. Specifically, the hydraulic damping arrangement 13 is made up, in the embodiment shown, in essence of a first hydraulic chamber 17 and a second hydraulic chamber 18, the two hydraulic chambers 17, 18 being filled with hydraulic fluid such as, say, hydraulic oil. The first hydraulic chamber 17 has a cylindrical hydraulic-chamber housing of its own which is held in the housing 11 of the damping system 10 in such a way as to be displaceable relative to this latter. On the other hand, the region between the end-wall of the hydraulic-chamber housing and the end-face of the second abutment 15 (the annular piston) constitutes the second hydraulic chamber 18.

The piston rod 2 runs through the resilient unit 12 and the second hydraulic chamber 18 and finally ends in the first hydraulic chamber 17. Formed in the end region of the piston rod 2 is a piston head 3 which is held in the first hydraulic chamber 17 in such a way as to be displaceable relative to a portion of the housing 11 of the first hydraulic chamber 17 and which, if there is a longitudinal movement of the piston rod relative to the first hydraulic chamber 17, divides the first hydraulic chamber 17 into a front hydraulic-chamber region 17a remote from the piston rod 2 and a rear hydraulic-chamber region 17b adjacent the piston rod 2.

When the damping system 10 is in the unloaded state, i.e. when neither tractive nor compressive forces are applied to the damping system 10 via the piston rod 2, the piston rod 2 is in a state in which the piston head 3 is withdrawn to a maximum relative to the first hydraulic chamber 17. As shown in FIG. 1, when the damping system 10 is in the unloaded state the rear side of the piston head 3 butts against the inner wall of the housing of the first hydraulic chamber 17. If there is a longitudinal movement of the piston head 3 relative to the housing of the first hydraulic chamber 17, the region of the first hydraulic chamber 17 which forms behind the piston head 3 becomes what will be referred to below as the "rear hydraulic-chamber region 17b" whereas the region of the first hydraulic chamber 17 in front of the piston head 3 becomes what will be referred to as the "front hydraulic-chamber region 17a".

The hydraulic damping arrangement 13 has a first transfer-flow system through which hydraulic fluid is able to flow from the front hydraulic-chamber region 17a into the rear hydraulic-chamber region 17b and into the second hydraulic chamber 18 if there is a longitudinal movement of the piston head 3 relative to the first hydraulic chamber 17 in the direction of the front hydraulic-chamber region 17a.

In addition to the first transfer-flow system, there is also provided a second transfer-flow system through which hydraulic fluid is able to flow from the rear hydraulic-chamber region 17b and the second hydraulic chamber 18 into the front hydraulic-chamber region 17a if there is a longitudinal movement of the piston head 3 relative to the first hydraulic chamber 17 in the direction of the rear hydraulic-chamber region 17b. In both cases the transfer flow of the hydraulic fluid takes place in a throttled manner and the longitudinal movement of the piston head 3 relative to the first hydraulic chamber 17 is thus damped.

Specifically, the basis of the first transfer-flow system in the embodiment of the device 100 according to the invention which is shown is a system of passages consisting of a plurality of passages 21, 22, 23, 24, 25 which form a connection for fluid between the first hydraulic chamber 17 and a gap 19 which is formed between the housing 11 of the damping system 10 and the portion of housing 11 of the first hydraulic chamber 17. This system of passages makes it possible for hydraulic fluid to flow through at least some of the passages 21, 22, 23, 24, 25 into the gap 19 if there is a longitudinal displacement of the piston head 3 into the rear hydraulic-chamber region 17b of the first hydraulic chamber 17.

What also belongs to the first transfer-flow system on the other hand is at least one multiplier valve 4, with the gap 19 which is formed between the housing 11 of the damping system 10 and the housing of the first hydraulic chamber 17 opening into the inlet region of the multiplier valve 4.

The outlet region of the multiplier valve 4 is connected directly to the second hydraulic chamber 18 by at least one passage 26 and to the rear hydraulic-chamber region 17b of the first hydraulic chamber 17 by at least one further passage 27 in which a ball non-return valve 5 is arranged. The ball non-return valve 5 arranged in the at least one further passage 27 is designed to automatically block hydraulic fluid from passing from the rear hydraulic-chamber region 17b to the valve chamber 6 of the multiplier valve 4, into which valve chamber 4 the outlet of the multiplier valve 4 opens.

Finally, what also counts as part of the first transfer-flow system is at least one further additional passage 28 which connects the rear hydraulic-chamber region 17b of the first hydraulic chamber 17 directly to the second hydraulic chamber 18.

The passages 21, 22, 23, 24, 25, 26, 27, 28 of the first transfer-flow system which have been described above allow hydraulic fluid to be able to flow from the front hydraulic-chamber region 17a into both the rear hydraulic-chamber region 17b and also into the second hydraulic chamber 18 if there is a longitudinal movement of the piston head 3 relative to the first hydraulic chamber 17 in the direction of the front hydraulic-chamber region 17a.

The second transfer-flow system, through which hydraulic fluid is able to flow from the rear hydraulic-chamber region 17b and the second hydraulic chamber 18 into the front hydraulic-chamber region 17a if there is a longitudinal movement of the piston head 3 relative to the first hydraulic chamber 17 in the direction of the rear hydraulic-chamber region 17b, is made up, in the embodiment shown, on the one hand of the at least one additional passage 28 which connects the rear hydraulic-chamber region 17b of the first hydraulic chamber 17 to the second hydraulic chamber 18 and of at least one further passage 29 which connects the second hydraulic chamber 18 to the gap 19 which is formed between the housing of the first hydraulic chamber 17 and the housing 11 of the damping arrangement 13. Provided in this at least one further passage 29 is a ball non-return valve 7 which is designed to automatically block hydraulic fluid from passing though the said further passage to the second hydraulic chamber 18.

In this way, it is possible, if there is a longitudinal movement of the piston head 3 relative to the first hydraulic chamber 17 in the direction of the rear hydraulic-chamber region 17b, for hydraulic fluid to be able to flow from the rear hydraulic-chamber region 17b via the at least one passage 28 to the second hydraulic chamber 18 and from there via the at least one further passage 29 in which the ball non-return valve 7 is provided into the gap 19 between the housing of the first hydraulic chamber 17 and the housing 11 of the damping system 10. The hydraulic fluid which flows into the said gap 19 makes its way via two passages 24, 25 of the system of passages into the front hydraulic-chamber region 17a of the first hydraulic chamber 17.

In the embodiment of the device 100 according to the invention which is shown, provision is made for those passages 21, 22, 23, 24, 25 of the system of passages which connect the first hydraulic chamber 17 to the gap 19 formed between the housing 11 of the damping system 10 and the portion of the housing 11 of the first hydraulic chamber 17 to open into the first hydraulic chamber 17 at a distance from one another in the longitudinal direction L of the first hydraulic chamber 17. The layout of the passages 21, 22, 23, 24, 25 of the system of passages is selected to be such in this case that, in a state where the piston head 3 is displaced to its maximum relative to the first hydraulic chamber 17 in the direction of the front hydraulic-chamber region 17a, at least one passage (passages 24 and 25 in the embodiment shown) still opens into the front hydraulic-chamber region 17a, whereas the remaining passages 21, 22, 23 open into the rear hydraulic-chamber region 17b. These latter passages 21, 22, 23 of the system of passages which open into the rear hydraulic-chamber region 17b each have a ball non-return valve 8 to automatically block hydraulic fluid from passing from the gap 19 through the said passages 21, 22, 23 into the rear hydraulic-chamber region 17b.

The layout and design of the individual passages 21, 22, 23, 24, 25 as described above makes it possible, if there is a displacement of the piston head 3 relative to the first hydraulic chamber 17 in the direction of the rear hydraulic-chamber region 17b, for hydraulic fluid to be able to flow from the rear hydraulic-chamber region 17b, on the one hand via the second transfer-flow system described above and on the other hand via those passages 21, 22 of the system of passages which open into the rear hydraulic-chamber region 17b, to the gap 19 which is formed between the housing 11 of the damping system 10 and the housing of the first hydraulic chamber 17.

However, the transfer flow of hydraulic fluid via at least some of the passages of the system of passages if there is a longitudinal movement of the piston head 3 relative to the first hydraulic chamber 17 in the direction of the rear hydraulic-chamber region 17b is only possible for as long as the mouths of the passages of the system of passages are not yet covered by the piston head 3. This is preferably the case when the piston head 3 has advanced into the first hydraulic chamber 17 as far as the centre thereof. In a state where the piston head 3 has not yet advanced that far into the first hydraulic chamber 17, hydraulic fluid is able to makes its way only via the second transfer-flow system to the front hydraulic-chamber region 17a of the first hydraulic chamber 17 if there is a longitudinal movement of the piston head 3 in the direction of the rear hydraulic-chamber region 17b.

On the other hand, the number of passages in the system of passages via which hydraulic fluid is able to flow from the front hydraulic-chamber region 17a into the gap 19 if there is a longitudinal movement of the piston head 3 in the direction of the front hydraulic-chamber region 17a also depends on the travel of the piston rod 2. The further the piston rod 2 has advanced into the first hydraulic chamber 17, the smaller the number of passages in the system of passages which open into the front hydraulic-chamber region 17a of the first hydraulic chamber 17.

The way in which the embodiment of the device 100 according to the invention which is shown operates will be described in detail below by reference to FIGS. 2 to 6.

Figure 2:
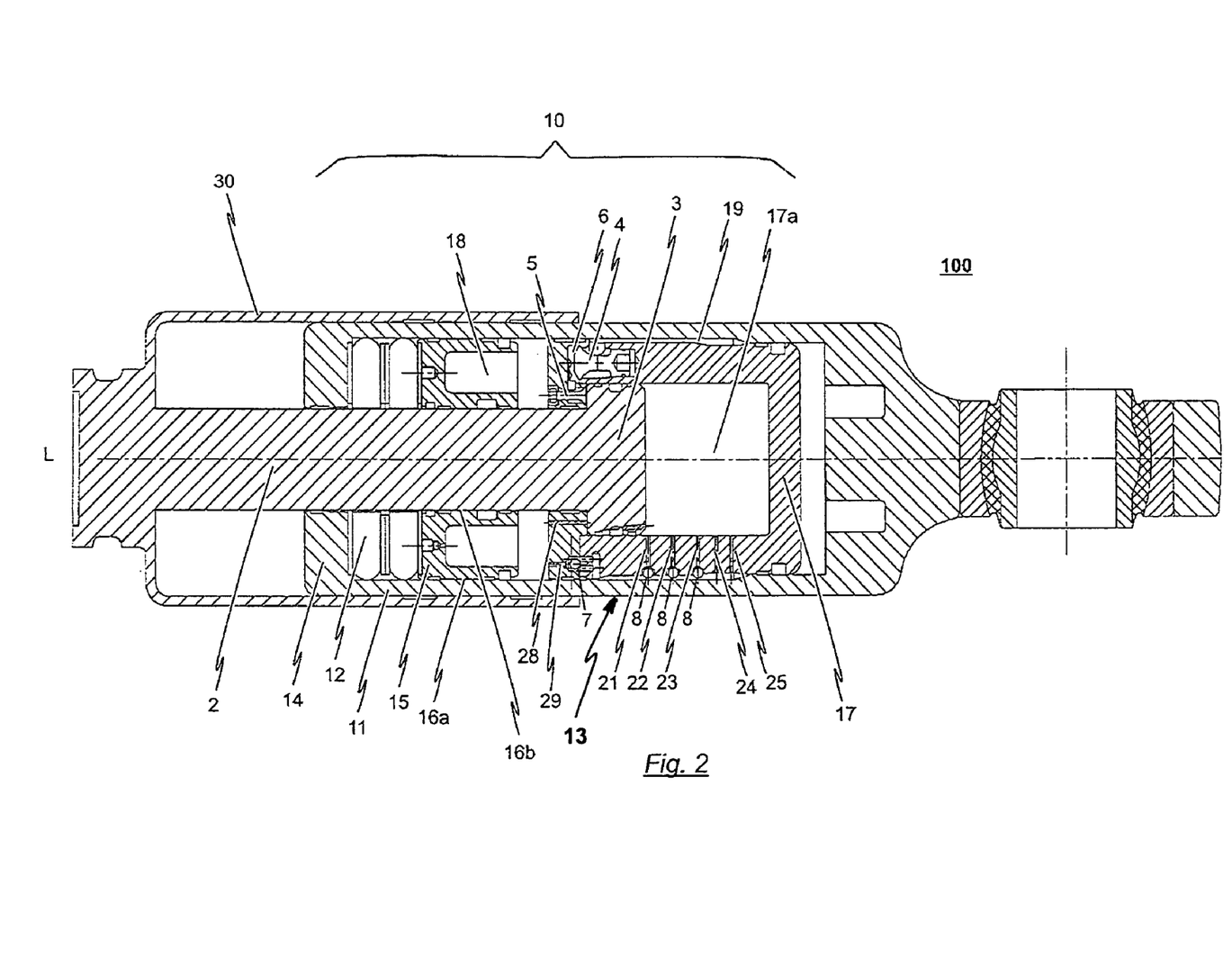
FIG. 2 is a schematic view in longitudinal section of the embodiment of the device according to the invention for damping tractive and compressive forces, when loaded in traction.

FIG. 2 is a schematic view in longitudinal section showing the embodiment of the device 100 according to the invention when stressed in traction. Comparison of FIGS. 1 and 2 at once shows that when the damping system 10 is stressed in traction the housing of the first hydraulic chamber 17 is displaced relative to the housing 11 of the damping system 10 in the direction of the resilient unit 12—as compared with the neutral position of the damping system 10 which is shown in FIG. 1. This is attributable to the fact that, when the damping system 10 is in the neutral position shown in FIG. 1 (its unloaded state), the rear side of the piston head 3 is already resting against that face of the housing of the first hydraulic chamber 17 which is at the end closer to the resilient unit. If then—as shown in FIG. 2—a tractive force is exerted on the piston rod 2, the housing of the first hydraulic chamber 17 is drawn, along with the piston rod 2, in the direction of the resilient unit 12. A pressure below atmospheric is thus generated at the rear end of the portion of housing 11 of the first hydraulic chamber 17 and opposes the tractive force applied to the portion of housing 11 of the first hydraulic chamber 17.

Because the piston head 3 is not displaced within the first hydraulic chamber 17 relative thereto if there is a tractive load on the damping system 10, there is also no flow of hydraulic fluid from the first hydraulic chamber 17 via the first transfer-flow system to the second hydraulic chamber 18.

The displacement of the housing of the first hydraulic chamber 17 relative to the housing 11 of the damping system 10 in the direction of the resilient unit 12 which is caused if there is a tractive load results in the pressure of the hydraulic fluid in the second hydraulic chamber 18 being increased in comparison with the unloaded state (see FIG. 1). At least some of the hydraulic fluid flows from the second hydraulic chamber 18 via the passage 29 belonging to the second transfer-flow system and those passages 24, 25 of the system of passages which are not provided with a ball non-return valve into the first hydraulic chamber 17, an equalisation of pressure thus taking place between the first hydraulic chamber and the second hydraulic chamber 18 when there is a quasi-static loading.

On the other side, the hydraulic fluid which is compressed in the second hydraulic chamber 18 exerts a compressive force on the second abutment 15, which is in the form of an annular piston in the embodiment shown, and causes the second abutment 15 to move relative to the housing 11 of the damping system 10 and relative to the first abutment 14 in the direction of the first abutment 14. In this way, the resilient unit 12 which is held between the first and second abutments 14, 15 is compressed. The restorative force from the resilient unit 12 opposes the compressive force from the hydraulic fluid held in the second hydraulic chamber 18 when this happens.

Hence, when there is a tractive load on the damping system 10, a damping effect is produced on the one hand by the build-up of a pressure below atmospheric between the housing 11 of the damping system 10 and that end-face of the first hydraulic chamber 17 which is remote from the resilient unit 12 and on the other hand by the compression of the resilient unit 12. What is also achieved at the same time is that, when the tractive loading on the housing 11 comes to an end, the first hydraulic chamber 17 moves back to its state which is shown in FIG. 1. As soon as there is no longer a tractive loading, the pressure below atmospheric and the expansive force from the resilient unit 12 thus cause a return to centre of the damping system 10 to its unloaded state shown in FIG. 1.

Figure 3:
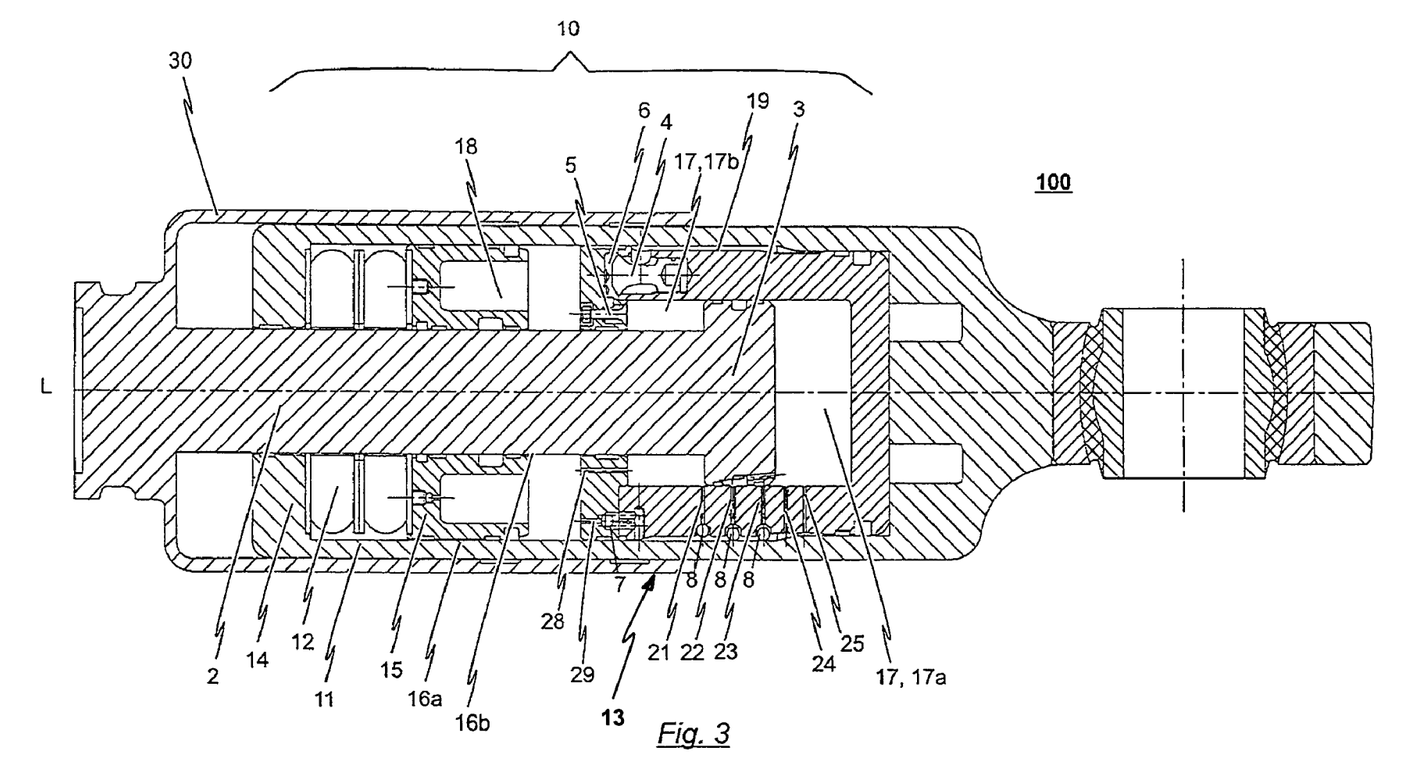
FIG. 3 is a schematic view in longitudinal section of the embodiment of the device according to the invention for damping tractive and compressive forces, when loaded in compression.

FIG. 3 is a schematic view in longitudinal section showing the embodiment of the device 100 according to the invention for damping tractive and compressive forces in a state where it is loaded in compression. Under a compression load, i.e. when compressive forces are applied to the damping system 10 via the piston rod 2, the piston rod 2, together with the piston head 3, shifts relative to the first hydraulic chamber 17 in the direction of the front hydraulic-chamber region 17*a*. This advance of the piston head 3 into the first hydraulic chamber 17 compresses the hydraulic fluid in the front hydraulic chamber. This results in hydraulic fluid flowing out of the front hydraulic-chamber region 17*a* via the first transfer-flow system into the rear hydraulic-chamber region 17*b*. Because the rear hydraulic-chamber region is in fluid connection with the second hydraulic chamber 18 via at least one passage 28, at least some of the fluid which was expelled when the piston head 3 advanced into the front hydraulic-chamber region 17*a* flows into the second hydraulic chamber 18 and causes a rise in pressure there. The increased pressure of the hydraulic fluid in the second hydraulic chamber 18 acts on the second abutment 15, which takes the form of an annular piston in the embodiment shown, and this latter thus moves relative to the housing 11 of the damping system 10 in the direction of the first abutment 14 and as it does so compresses the resilient unit 12 held between the first abutment and the second abutment 15.

Hence, when the damping system 10 is loaded in compression, a damping effect is caused on the one hand by a throttled transfer flow of the hydraulic fluid which is expelled from the front hydraulic-chamber region 17*a* and on the other hand by the compression of the resilient unit 12.

As already mentioned, when the piston head 3 advances into the front hydraulic-chamber region 17*a* the hydraulic fluid which is expelled when it does so flows via the passages 21, 22, 23, 24, 25 of the system of passages to the gap 19 and from there, via the at least one multiplier valve 4, into the rear hydraulic-chamber region 17*b* and into the second hydraulic chamber 18. In the embodiment of the device 100 according to the invention which is shown, those passages 21, 22, 23, 24, 25 of the system of passages which connect the first hydraulic chamber 17 to the gap 19 are arranged at a distance from one another in the longitudinal direction L of the first hydraulic chamber 17. The result of this is that the effective flow cross-section of the system of passages, i.e. the number of the passages 21, 22, 23, 24, 25 through which the hydraulic fluid which is expelled when the piston head 3 advances into the first hydraulic chamber 17 is able to flow into the gap 19, depends on how far the piston head 3 has been displaced relative to the first hydraulic chamber 17 in the direction of the first hydraulic-chamber region 17*a*. In other words, the farther the piston head 3 has advanced into the first hydraulic chamber 17, the smaller the number of passages in the system of passages through which the hydraulic fluid expelled from the front hydraulic-chamber region 17*a* is able to flow into the gap 19 and from there via the at least one multiplier valve 4 into the rear hydraulic chamber and the second hydraulic chamber 18. It should be borne in mind in this case that when a shock load is applied to the device the speed of the colliding bodies relative to one another decreases. The speed at which the piston rod is forced in thus goes down too. Because the hydraulic forces depend amongst other things on the speed at which the piston rod is forced in and the effective flow cross-section over which the hydraulic fluid expelled from the front hydraulic-chamber region is able to flow to the input of the multiplier valve, the effective flow cross-section is reduced with increasing travel of the piston rod, in order to keep the hydraulic forces very largely constant.

Figure 4:
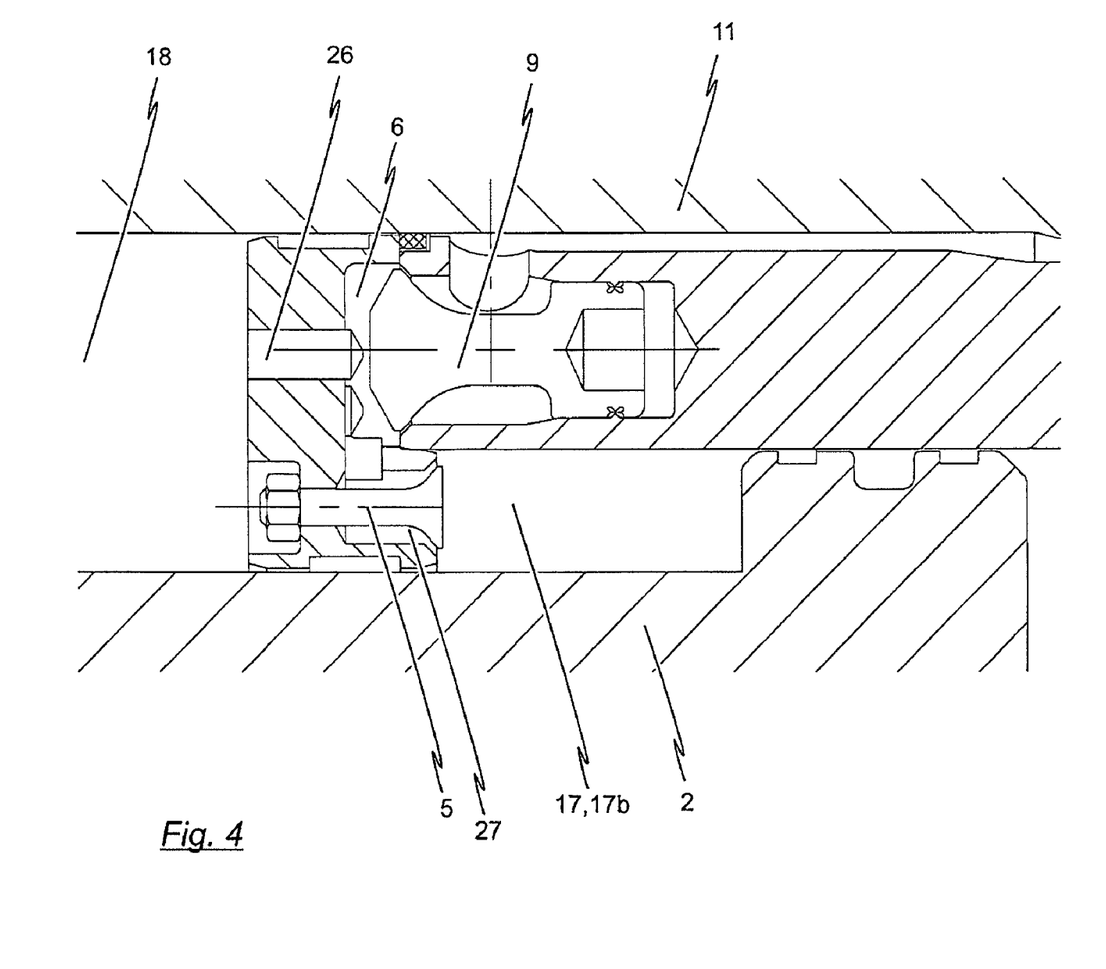
FIG. 4 show a detail of FIG. 3 to clarify the operation of the at least one multiplier valve which is used in the device.

FIG. 4 shows a detail of the schematic view in longitudinal section shown in FIG. 3. What specifically is shown in FIG. 4 is the multiplier valve 4 when the damping system 10 is loaded in compression quasi-statically. Under quasi-static loading, the piston head 3 advances into the first hydraulic chamber 17 relatively slowly in comparison with dynamic loading in compression, and there is thus a comparative moderate rise in pressure in the front hydraulic-chamber region 17*a*. The rise in pressure in the front hydraulic-chamber region 17*a* of the first hydraulic chamber 17, and hence in the gap 19 too, which is caused under quasi-static loading in compression acts on the control piston 9 of the multiplier valve 4 which, as a result, is displaced relative to the housing 11 of the damping system 10 and relative to the housing 11 [sic] of the first hydraulic chamber 17 in the direction of the resilient unit 12. At the same time, what also acts on the control piston 9 of the multiplier valve 4 is a pressure below atmospheric which is generated at the rear end of the control piston 9 when the control piston 9 is displaced relative to the first hydraulic chamber 17. Specifically, an air chamber 30 is provided behind the control piston 9, the ambient pressure of the atmosphere setting itself in this air chamber 30 when the device according to the invention is assembled. When the control piston 9 is actuated, the volume of the air chamber 30 is increased, and a corresponding pressure below atmospheric is thus generated. Due to the displacement of the control piston 9 in the direction of the resilient unit 12, the multiplier valve 4 opens at least partly, and the hydraulic fluid which is under high pressure in the gap 19 is thus able to flow via the multiplier valve 4 into the valve chamber 6 into which the outlet of the multiplier valve 4 opens. As can be seen in particular from FIG. 4, this valve chamber 6 is connected on the one hand by at least one passage 26 directly to the second hydraulic chamber 18. On the other hand, the hydraulic fluid which flows into the valve chamber 6 via the multiplier valve 4 is able to flow into the rear hydraulic-chamber region 17b of the first hydraulic chamber 17 via the ball non-return valve 5.

Figure 5A:
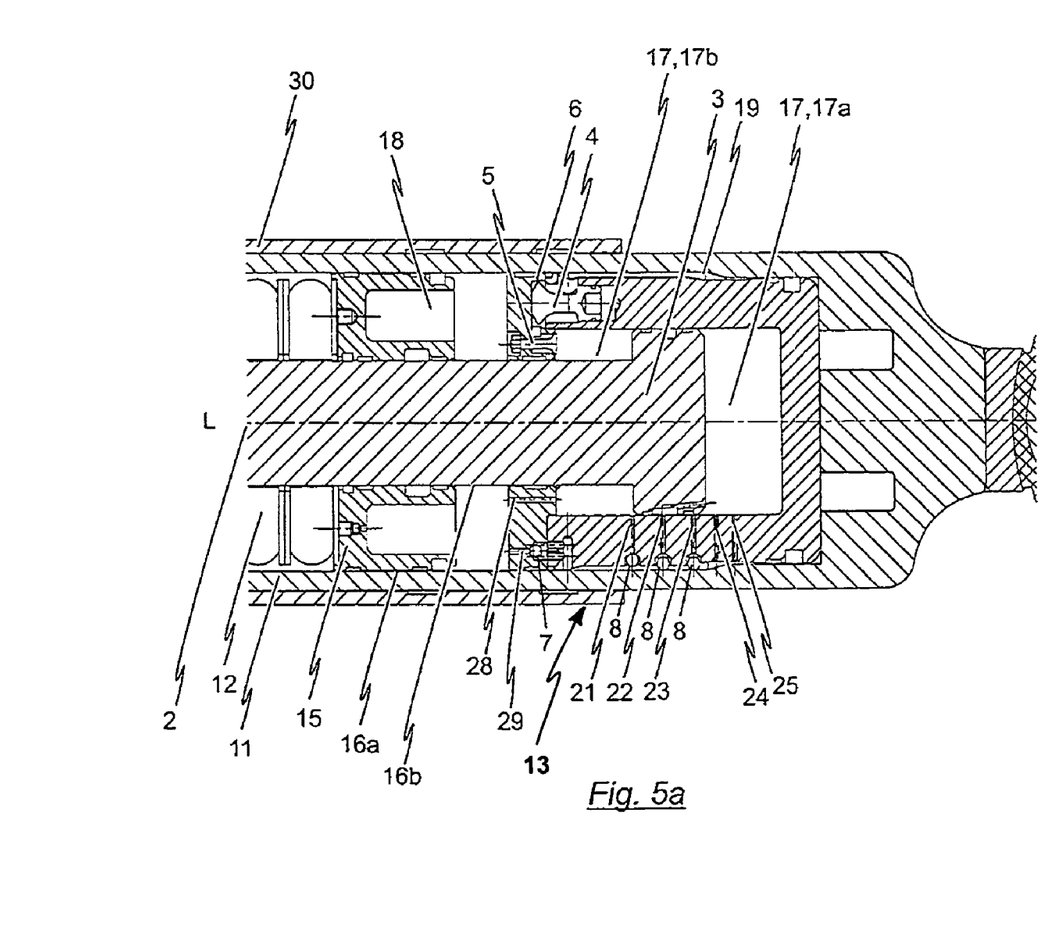
FIG. 5a shows a detail of a schematic view in longitudinal section of the embodiment of the device according to the invention for damping tractive and compressive forces where the piston is at least partly advanced, to clarify the return travel caused by the resilient unit used in the device.
Figure 5B:
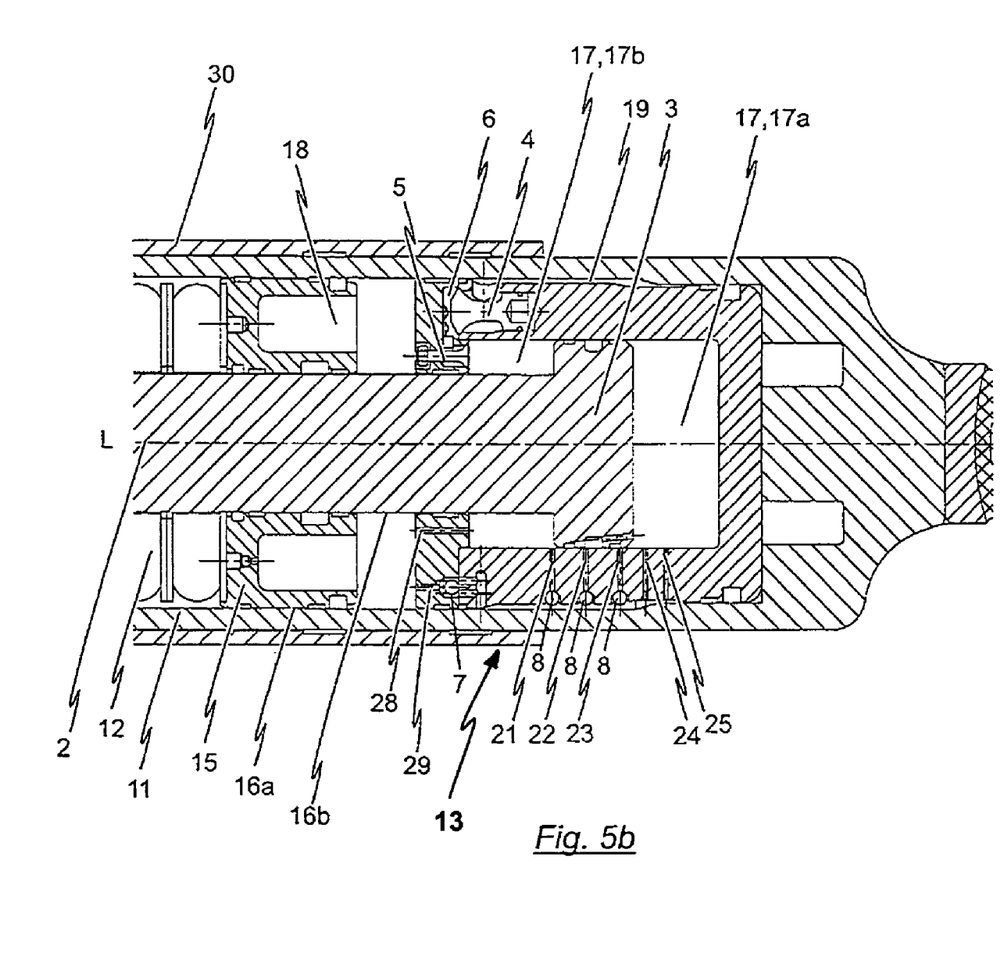
FIG. 5b shows a detail of a schematic view in longitudinal section of the embodiment of the device according to the invention for damping tractive and compressive forces when, in comparison with FIG. 5a, the piston is already at least partly reset.

In what follows, it will be described by reference to FIGS. 5a and 5b how a reset to the unloaded state shown in FIG. 1 is caused to occur when the piston head 3 has been advanced into the first hydraulic chamber 17 due to a compressive loading, and pressure then ceases to be applied to the damping system 10.

As has previously been described by reference with the view in FIG. 3, in the state where a compressive load is present the resilient unit 12 is in a compressed state because the increased pressure in the second hydraulic chamber 18 displaces the second abutment 15 in the direction of the first abutment 14. Once the compressive load ceases, hydraulic fluid is forced out of the second hydraulic chamber 18 by the expansive forces from the resilient unit 12 and by the displacement caused by these forces of the second abutment 15 relative to the housing 11 of the damping system 10 away from the first abutment 14. When this happens, the hydraulic fluid flows via the second transfer-flow system into the front hydraulic-chamber region 17a of the first hydraulic chamber 17. The result of this is that the piston head 3 is displaced in the direction of the neutral position shown in FIG. 1. This displacement of the piston head 3 relative to the first hydraulic chamber 17 in the direction of the rear hydraulic-chamber region 17b results in hydraulic fluid flowing out of the rear hydraulic-chamber region 17b via the at least one passage 28 into the second hydraulic chamber 18 and from there via the second transfer-flow system into the front hydraulic-chamber region 17a of the first hydraulic chamber 17.

On the other hand, the hydraulic fluid which is expelled from the rear hydraulic-chamber region 17b as the piston head 3 is displaced longitudinally in the direction of the said rear hydraulic-chamber region 17b is also able to flow directly into the gap 19, via at least one passage 21 of the system of passages, and from there into the front hydraulic-chamber region 17a. This is the state shown in FIG. 5a.

However, the bypass which is provided by the said passage 21 of the system of passages between the rear hydraulic-chamber region 17b and the gap 19 is only available when the piston head 3 has advanced a relatively long distance into the first hydraulic chamber 17. A comparison of the views in FIGS. 5a and 5b shows that the passages 21, 22, 23, 24, 25 of the system of passages no longer open into the rear hydraulic-chamber region 17b of the first hydraulic chamber 17 when the piston head 3 has been displaced further in the direction of the rear hydraulic-chamber region 17b than it has been when in the state shown in FIG. 5a.

Figure 6:
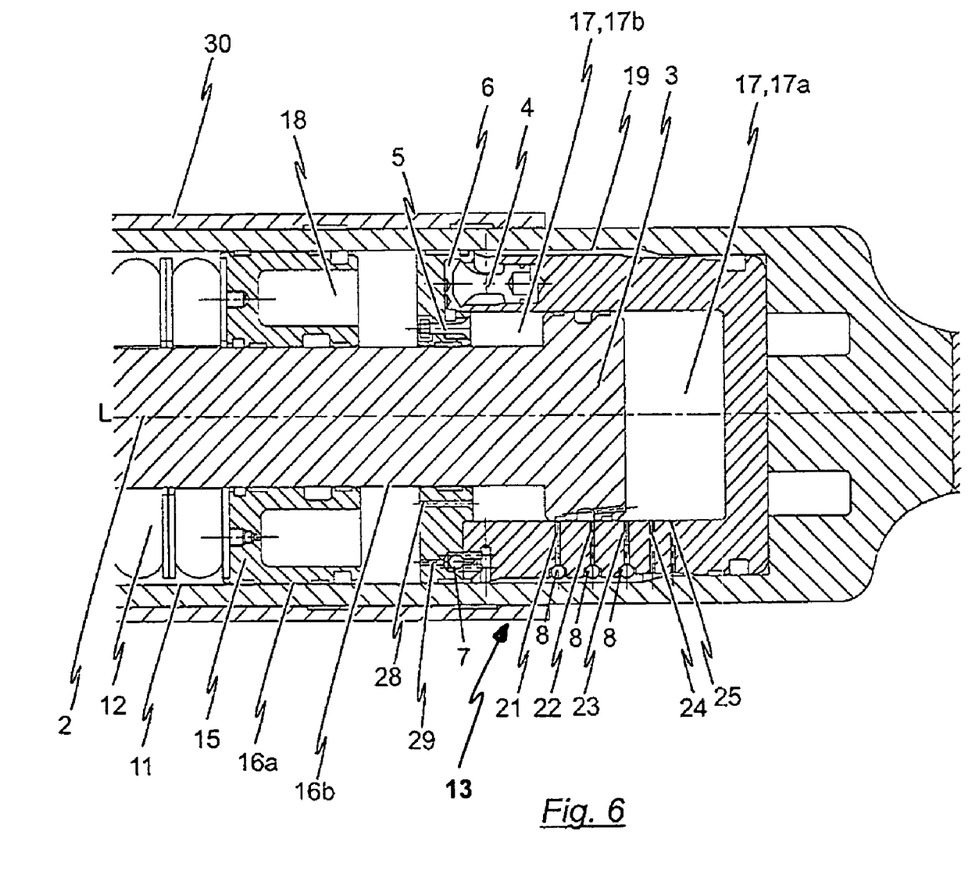
FIG. 6 shows a detail of a schematic view in longitudinal section of the embodiment of the device according to the invention for damping tractive and compressive forces, when under a dynamic compressive stress.

In what follows, a description will be given, by reference to FIG. 6, of a state of the device 100 for damping tractive and compressive forces where there is dynamic compressive loading. In contrast to what happens when there is quasi-static compressive loading, when there is dynamic compressive loading, the pressure in the front hydraulic-chamber region 17a builds up suddenly. The hydraulic fluid which is thereby compressed flows via the passages 21, 22, 23, 24, 25 of the system of passages into the gap 19, and there is thus also a relatively high pressure present at the inlet of the at least one multiplier valve 4. The result of this is that the multiplier valve 4 opens fully, and the hydraulic fluid thus makes its way into the valve chamber 6 via the multiplier valve 4 with a comparatively small pressure drop. From there the hydraulic fluid flows via the ball non-return valve 5 into the rear hydraulic-chamber region 17b. Because the rear hydraulic-chamber region 17b is connected to the second hydraulic chamber 18 by the at least one passage 28, the hydraulic fluid also makes its way into the second hydraulic chamber 18 and produces a rise in pressure there, which in turn results in the resilient unit 12 being compressed.

The at least one passage 26 which connects the valve chamber 6 directly to the second hydraulic chamber 18 is blocked by the control piston 9 of the multiplier valve 4 when the multiplier valve 4 is in the fully open state (see FIG. 6), and the hydraulic fluid is thus unable to make its way directly from the valve chamber 6 into the second hydraulic chamber 18.

In the embodiment of the device 100 according to the invention which is shown, the piston rod 2 is connected by its opposite end region from the piston head 3 to a cup-like outer housing 30, the housing 11 of the damping system 10 being at least partly held in the outer housing 30 to be telescopically displaceable in the longitudinal direction L relative to the outer housing 30. The outer housing 30 and the housing 11 of the damping system 10 have guiding surfaces to guide the movement of the piston rod 2 relative to the housing 11 of the damping system 10 in the appropriate way.

To obtain a particularly small overall length, provision is made in the embodiment shown for the distance by which the housing 11 of the damping system 10 is displaceable relative to the outer housing 30 to correspond to the travel which the piston head 3 makes between a front position, in which the piston head 3 is displaced to a maximum relative to the first hydraulic chamber 17 in the direction of the front hydraulic-chamber region 17a, and a rear position in which the piston head 3 is displaced to a maximum relative to the first hydraulic chamber in the direction of the rear hydraulic-chamber region 17b.

On the other hand, the distance by which the first hydraulic chamber 17 is able to move relative to the housing 11 of the damping system 10 in the longitudinal direction L corresponds to the distance by which the resilient unit 12 is compressed when the piston head 3 is displaced from its rear position, in which the piston head 3 is displaced to a maximum relative to the first hydraulic chamber 17 in the direction of the rear hydraulic-chamber region 17b, to its front position in which piston head 3 is displaced to a maximum relative to the first hydraulic chamber 17 in the direction of the front hydraulic-chamber region 17a.

The invention is not limited to the embodiment of the device 100 for damping tractive and compressive forces which has been described by reference to the accompanying drawings. Instead, appropriate modifications are conceivable.

The device 100 according to the invention is suitable in particular for use as a regenerative damping system 10 in a coupling bar of a centre buffer coupling. It is for example conceivable in this case for the housing 11 of the damping system 10 to be pivotably connected to the end-face of a body of a railway vehicle, while the coupler head is fastened directly or via a coupling bar to the outer housing 30 or to the piston rod 2. In this embodiment, the tractive and compressive forces which act on the coupler head are applied to the damping system 10 and are at least partly damped by it.

Although this is not shown in the drawings, it is basically conceivable for an overload valve to be connected in parallel with the control piston 9 of the multiplier valve 4, this overload valve blocking the hydraulic fluid from passing from the front hydraulic-chamber region 17a into the rear hydraulic-chamber region 17b and into the rear hydraulic chamber 18.

The invention claimed is:

1. A device for damping tractive and compressive forces, wherein the device comprises:

a damping system which is held in a housing and which has a resilient unit and a hydraulic damping arrangement, the resilient unit being arranged between a first abutment which is in a fixed position relative to the housing and a second abutment which is displaceable relative to the first abutment, and the hydraulic damping arrangement having a first hydraulic chamber which is filled with hydraulic fluid and a second hydraulic chamber which is filled with hydraulic fluid and which is formed between the first hydraulic chamber and the second abutment, and a piston rod which is displaceable in the longitudinal direction relative to the housing and having a piston head which is formed in the piston rod's end region, wherein the piston head is held in the first hydraulic chamber in such a way as to be displaceable relative to the first hydraulic chamber and, wherein when the piston rod undergoes a longitudinal displacement relative to the first hydraulic chamber, the piston rod divides the first hydraulic chamber into a front hydraulic-chamber region remote from the piston rod and a rear hydraulic-chamber region adjacent the piston rod, wherein the hydraulic damping arrangement has a first transfer-flow system via which hydraulic fluid is able to flow from the front hydraulic-chamber region via at least one multiplier valve into the rear hydraulic-chamber region and into the second hydraulic chamber when there is a longitudinal movement of the piston head relative to the first hydraulic chamber in the direction of the front hydraulic-chamber region, and wherein the hydraulic damping arrangement has a second transfer-flow system via which hydraulic fluid is able to flow from the rear hydraulic-chamber region and the second hydraulic chamber via a ball non-return valve into the front hydraulic-chamber region when there is a longitudinal movement of the piston head relative to the first hydraulic chamber in the direction of the rear hydraulic-chamber region.

2. The device according to claim 1, wherein a system of passages is provided which connects the first hydraulic chamber to the input of the multiplier valve, wherein the effective flow cross-section of the system of passages depends on how far the piston head is displaced relative to the first hydraulic chamber in the direction of the front hydraulic-chamber region.

3. The device according to claim 2, wherein the system of passages has a plurality of passages which connect the first hydraulic chamber to the inlet of the multiplier valve, the passages opening into the first hydraulic chamber at a distance from one another in the longitudinal direction (L) of the first hydraulic chamber.

4. The device according to claim 2, wherein, when the piston head is displaced to the piston head's maximum relative to the first hydraulic chamber in the direction of the front hydraulic-chamber region, the system of passages has at least one passage which opens into the rear hydraulic-chamber region and at least one passage which opens into the front hydraulic-chamber region.

5. The device according to claim 4, wherein that at least one passage of the system of passages which, when the piston head is displaced to the piston head's maximum in the direction of the front hydraulic-chamber region, opens into the rear hydraulic-chamber region has a ball non-return valve which automatically blocks hydraulic fluid from passing through the at least one passage to the rear hydraulic-chamber region.

6. The device according to claim 3, wherein a gap is formed, at least in a region or regions, between the first hydraulic chamber and the housing of the damping system, the inlet of the multiplier valve being connected to the first hydraulic chamber via the gap.

7. The device according to claim 6, wherein the ball non-return valve which is provided between the second hydraulic chamber and the front hydraulic-chamber region is arranged in a passage which connects the front hydraulic-chamber region to the gap which is formed at least in a region or regions between the first hydraulic chamber and the housing of the damping system, and wherein the ball non-return valve is designed to automatically block hydraulic fluid from passing from the gap to the second hydraulic chamber.

8. The device according to one claim 1, wherein at least one passage is provided which connects the rear hydraulic-chamber region to the second hydraulic chamber and allows hydraulic fluid to pass from the rear hydraulic-chamber region to the second hydraulic chamber and vice versa.

9. The device according to claim 1, wherein the outlet of the multiplier valve opens into a valve chamber which is connected to the rear hydraulic-chamber region via a ball non-return valve, the ball non-return valve automatically blocking hydraulic fluid from passing from the rear-hydraulic-chamber region to the valve chamber.

10. The device according to claim 9, wherein at least one passage is provided which connects the valve chamber directly to the second hydraulic chamber, with the control piston of the multiplier valve blocking the at least one passage when the multiplier valve is in the fully open state.

11. The device according to claim 1, wherein the first hydraulic chamber is held in the housing of the damping system in such a way as to be displaceable relative to the housing in the direction of the resilient unit, a pressure below ambient pressure being generated between the housing and that end-face of the first hydraulic chamber which is remote from the resilient unit if there is a longitudinal displacement of the first hydraulic chamber in the direction of the resilient unit.

12. The device according to claim 11, wherein the distance for which the first hydraulic chamber is able to move in the longitudinal direction (L) relative to the housing of the damping system corresponds to that distance for which the resilient unit is compressed when the piston head moves, from the piston head's rear position in which the piston head is displaced to the piston head's maximum relative to the first hydraulic chamber in the direction of the rear hydraulic-chamber region, to the piston head's front position in which the piston head is displaced to the piston head's maximum relative to the first hydraulic chamber in the direction of the front hydraulic-chamber region.

13. The device according to claim 11, wherein the resilient unit is in an uncompressed state when the piston head is in the piston head's front position and the first hydraulic chamber has not been displaced in the longitudinal direction (L) relative to the housing of the damping system.

14. The device according to claim 1, wherein an outer housing is provided to which the end region of the piston rod opposite from the piston head is connected, the housing of the damping system being held in the outer housing in such a way as to be at least partly displaceable telescopically in the longitudinal direction (L) relative to the outer housing.

15. The device according to claim 14, wherein the distance for which the housing of the damping system is displaceable relative to the outer housing corresponds to the travel which the piston head makes between a front position, in which the piston head is displaced relative to the first hydraulic chamber to the piston head's maximum in the direction of the front hydraulic-chamber region, and a rear position in which the piston head is displaced relative to the first hydraulic chamber to the piston head's maximum in the direction of the rear hydraulic-chamber region.

16. The device according to claim 1, wherein guiding surfaces are provided to guide the movement of the piston rod relative to the housing of the damping system.

17. The device according to claim 1, wherein the resilient unit has at least one spring and in particular a coil, disc, annular, rubber or elastomer spring which is held in an encapsulated form in the space between the first abutment and the second abutment.

* * * * *